(12) United States Patent
Nakamura et al.

(10) Patent No.: US 8,348,332 B2
(45) Date of Patent: Jan. 8, 2013

(54) PARTITION STRUCTURE AND INSTALLATION STRUCTURE FOR INSTALLATION PART

(75) Inventors: Mitsuyoshi Nakamura, Saitama (JP); Hajime Seino, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/962,886

(22) Filed: Dec. 8, 2010

(65) Prior Publication Data

US 2011/0140480 A1 Jun. 16, 2011

(30) Foreign Application Priority Data

Dec. 11, 2009 (JP) .................... 2009-281771
Dec. 14, 2009 (JP) .................... 2009-282925

(51) Int. Cl.
*B62D 25/00* (2006.01)
(52) U.S. Cl. .................. 296/187.05
(58) Field of Classification Search ............ 296/24.4, 296/187.05
See application file for complete search history.

(56) References Cited

U.S. PATENT DOCUMENTS

| | | | | |
|---|---|---|---|---|
| 2,584,506 A * | 2/1952 | Shreve | ............ | 105/370 |
| 3,049,373 A * | 8/1962 | Biggers | ............ | 296/106 |
| 3,169,781 A * | 2/1965 | Abruzzino | ............ | 280/749 |
| 3,172,702 A * | 3/1965 | Rose | ............ | 297/397 |
| 3,423,121 A * | 1/1969 | Lipkin | ............ | 296/24.4 |
| 5,375,879 A * | 12/1994 | Williams et al. | ............ | 280/749 |
| 5,839,757 A * | 11/1998 | von Lange et al. | ............ | 280/749 |
| 5,848,665 A * | 12/1998 | Rexroad et al. | ............ | 182/138 |
| 5,876,064 A * | 3/1999 | Ament et al. | ............ | 280/749 |
| 5,879,048 A * | 3/1999 | Tower | ............ | 296/152 |
| 6,626,462 B2 * | 9/2003 | Saczalski et al. | ............ | 280/749 |
| 6,983,970 B2 * | 1/2006 | Bateman | ............ | 296/24.43 |
| 7,819,451 B2 * | 10/2010 | Yoshida | ............ | 296/24.4 |
| 2009/0261636 A1 | 10/2009 | Jeong | | |

FOREIGN PATENT DOCUMENTS

| | | |
|---|---|---|
| JP | 3-123104 U | 12/1991 |
| JP | 6-300023 A | 10/1994 |
| JP | 10-217816 A | 8/1998 |
| JP | 11-139348 A | 5/1999 |
| JP | 2002-188617 A | 7/2002 |

* cited by examiner

*Primary Examiner* — H Gutman
(74) *Attorney, Agent, or Firm* — Carrier Blackman & Associates, P.C.; Joseph P. Carrier; William D. Blackman

(57) ABSTRACT

A partition structure for absorbing an impact energy applied to the partition for petitioning a vehicle room includes a cover, a plurality of reinforcing member (wires) arranged with an interval in the vehicle width direction inside the cover, and a belt arranged behind the reinforcing member so as to intersect the reinforcing member. An installation structure for an installation part fixes an installation part to an installation target member by engaging and screwing the bolt with nut. A fixing seat is formed on a back surface of the installation target member integrally with the installation target member. A bolt is arranged in the fixing seat through the installation target member, and a holding part holding a nut on a back surface side of the seating face to prevent the nut from rotating.

6 Claims, 13 Drawing Sheets

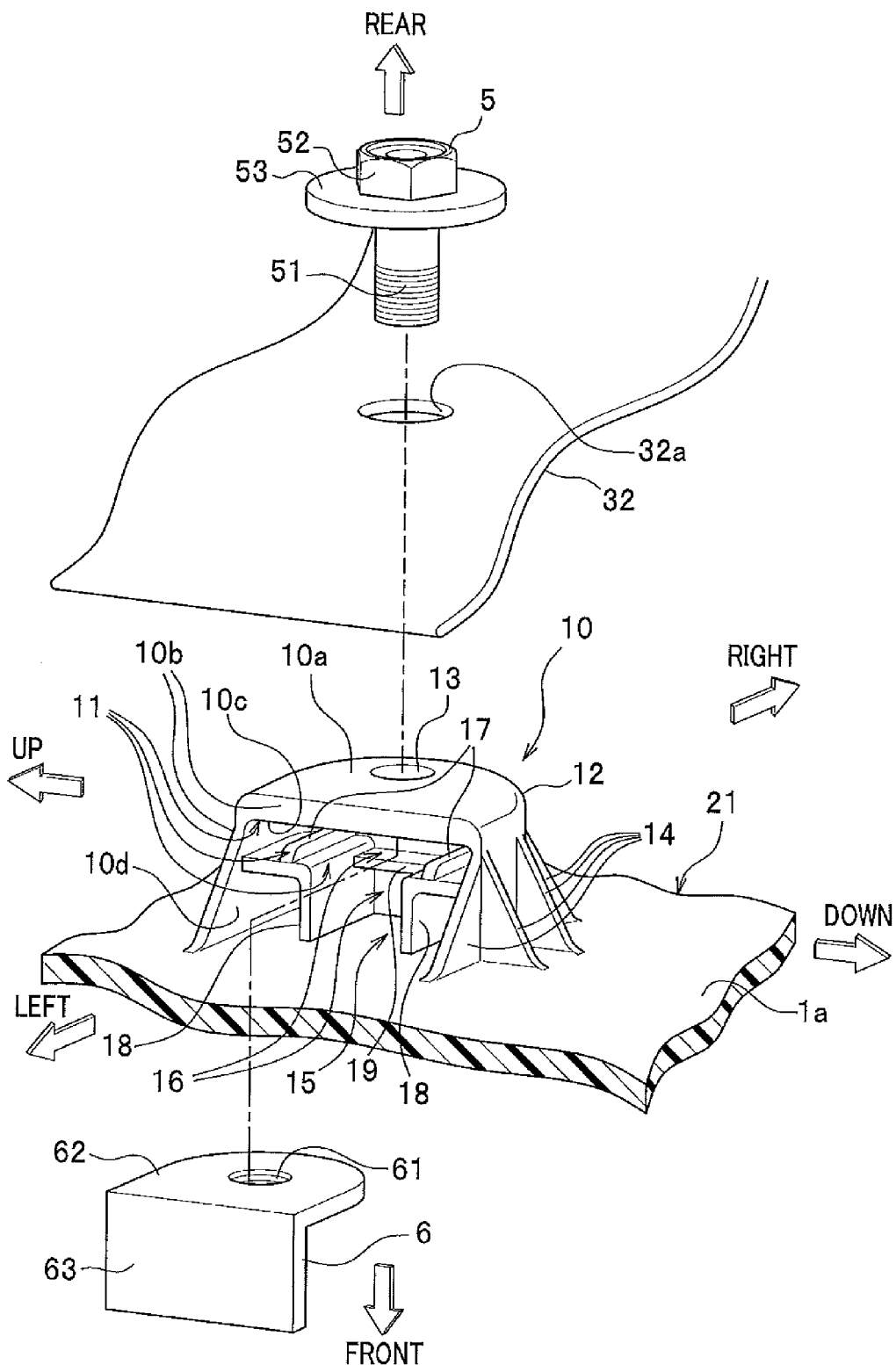

PARTITION STRUCTURE AND INSTALLATION STRUCTURE FOR INSTALLATION PART

CROSS REFERENCE TO RELATED APPLICATION

This application claims the foreign priority benefit under Title 35, United States Code, §119(a)-(d) of Japanese Patent Application No. 2009-281771, filed on Dec. 11, 2009 in the Japan Patent Office and Japanese Patent Application No. 2009-282925, filed on Dec. 14, 2009 in the Japan Patent Office, the disclosures of which are herein incorporated by reference in their entirety.

BACKGROUND OF THE INVENTION

1. Field of the Invention

The present invention relates to a partition structure for absorbing impact energy and an installation structure for an installation part.

2. Description of the Related Art

Conventionally, in vehicles such as motor vehicles, a partition is provided to partition a room. JP 11-139348 A discloses a technology for suppressing deformation against an external force by forming a partition integrally with beads (folding or channel) to increase a stiffness of the partition itself.

For example, there may be a case that a cargo moves forward by an inertial force at a frontal collision or a quick service (strong braking) and collides with the partition. However, in the structure of which stiffness itself is enhanced, when the cargo collides with the partition, if the impact exceeds a limit in strength, the partition is destroyed at a burst. Then, fragments of the partition may fly toward a crew (front side of the partition). This is a problem.

On the other hand, to install an installation part at an installation position of an installation target member, generally a bolt and a nut are frequently used. JP 6-300023 A discloses this in FIG. 1.

In an installation unit for a counter weight used in, for example, a construction equipment disclosed in JP 6-300023 A in FIG. 1, the nut may rotate together with the bolt when the bolt is rotated to engage with the nut to fix an installation part (counter weight) to an installation target member (frame). To avoid the rotation of the nut, the installation unit is formed integrally with a jam plate to prevent the nut from rotating.

In the installation unit for installing the counter weight in, for example, a construction equipment disclosed in JP 6-300023 A in FIG. 1, the jam plate which is bent in L-shape from a washer plate to abut a place on an outer circumferential surface of the nut. This prevents the nut from rotating together with the bolt.

In such the bolt and the nut, when the bolt is engaged and screwed with the nut, the rotation of the nut together with the bolt can be prevented. However, when the nut on an opposite side of the frame is engaged and screwed with the bolt, the nut may drop if an installation operation is performed with the nut being holed by a hand.

Therefore, when the nut which is one fixing member is engaged and screwed with the bolt which is the other fixing member, there is a problem in that a workability is low.

Particularly, in a case that a size of the installation part (counter weight) or the installation target member (frame) is large, when an operator holds the bolt on a top surface side and the nut on the back surface by both hands simultaneously, it is difficult to fasten the bolt because the operator cannot reach the nut by hand.

SUMMARY OF THE INVENTION

The present invention provides a partition structure capable of suppressing scattering of fragments due to breakage of the partition by increasing an impact absorbing characteristic of the partition.

A first aspect of the present invention provides a partition structure for absorbing an impact energy applied to a partition partitioning a room in a vehicle, comprising:
 a cover;
 a plurality of reinforcing members, extending in a direction substantially vertical to a width direction of the vehicle, arranged with an interval inside the cover in the width direction of the vehicle; and
 a belt arranged behind the reinforcing members so as to intersect the reinforcing members.

Preferably, each of the reinforcing members is a wire, and the belt is webbing (strap) of a seat belt unit.

According to the first aspect of the present invention, a plurality of the reinforcing members are arranged with an interval in a vehicle width direction inside a cover, and the belt is arranged behind the reinforcing members in which the belt intersects each of the reinforcing members. This allows a load caused by a collision to be transmitted to the belt and then to each of the reinforcing members via the belt although cargos loaded on a place behind the partition move forward by an inertial force caused by for, example, a front collision or a quick service. Accordingly, the load can be dispersed to the belt and a plurality of the reinforcing members, so that an impact absorbing characteristic of the partition can be increased, and the partition can be easily broken. If the partition was broken, the break advances with the impact energy being absorbed. This prevents the fragments of the partition from scattering to the crew side (forward from the partition).

A second aspect based on the first aspect of the present invention provides the partition structure further comprising a pair of pipe frames arranged in up-down direction with an interval in front of one of the reinforcing members, both ends of the one reinforcing member being fixed to the pair of the pipe frames. This structure allows the impact load to be transmitted to a pair of the pipe frames through the belt and the reinforcing members. Accordingly, this structure can further disperse the load with a result that the impact absorbing characteristic of the partition can be increased.

A third aspect based on the first aspect of the present invention provides the partition structure further comprising:
 a pair of side pipe frames arranged with an interval in the width direction of the vehicle; and
 an auxiliary wire, extending in the width direction of the vehicle, arranged in front the reinforcing members so as to intersect the reinforcing members, both ends of the auxiliary wire being fixed to the pair of side pipe frames. This structure allows the impact load to be transmitted to the auxiliary wire and the pair of side pipe frames through the belt and each of the reinforcing members. Accordingly, this structure allows the impact load to be further dispersed, so that the impact absorbing characteristic of the partition can be increased.

A fourth aspect based on the first aspect of the present invention provides the partition structure, wherein the cover comprises a front cover arranged on a side of a driver's seat of the vehicle and a rear cover on an opposite side of the front cover viewed from the side of the driver's seat. This structure allows the rear cover to be easily broken, so that the impact load is smoothly transmitted to the member such as the belt. On the other hand, this structure makes it difficult for the front cover to be broken, which prevents fragments of the front cover from scattering and flying to the side of the crew.

Accordingly the partition structure of the present invention can increase the impact absorbing characteristic of the partition and suppresses scattering and flying of the fragments of the broken partition.

In addition, the present invention provides an installation structure of the installation part which allows the installation part to be easily installed on an installation target member such as a panel member.

A fifth aspect of the present invention provides an installation structure for an installation part fixed to an installation target member by engaging and screwing one fixing member with an other fixing member, comprising:

a fixing seat formed integrally with the installation target member on the installation target member, wherein the fixing seat comprises:
a seating face on which the other fixing member is arranged through the installation target; and
a holding part configured to hold the one fixing member on a back surface of the seating face and prevent the one fixing member from rotation.

According to the fifth aspect of the present invention, the holding part holds the one fixing member on the fixing seat to prevent the one fixing member from rotating. Accordingly, an operator can engage the other fixing member with the one fixing member and screw the other fixing member on the one fixing member without holding one fixing member by hand. As a result, the installation part can be easily fixed to the installation target member with the one fixing member and the other fixing member. This increases workability of an instillation operation.

A sixth aspect based on the fifth aspect of the present invention provides the installation structure, wherein the fixing seat comprises a side face having an opening and an engaging space for the one fixing member to be engaged with the other fixing member, and wherein the seating face comprises a through hole through which the other fixing member penetrates. According to the sixth aspect based on the fifth aspect of the present invention, the one fixing member can be held by the holding part while the other fixing member is inserted into the engaging space through the opening. Although the other fixing member inserted into the holding part through the opening of the fixing seat is rotated, the one fixing member is prevented from rotating together with the other fixing member held in the holding part, so that the other fixing member can be easily engaged with the one fixing member. Accordingly, this structure can increase the workability of the installation operation because it is not necessary to hold the one fixing member when the installation part is fixed to the installation target member by engaging and screwing the other fixing member with the one fixing member.

A seventh aspect based on the sixth aspect of the present invention provides the installation structure, wherein the other fixing member comprises a bolt, and the one fixing member comprises a nut to be engaged with and screwed on the bolt. According to the seventh aspect based on the sixth aspect of the present invention, the other fixing member comprises a bolt, and the one fixing member comprises a nut to be screwed on the bolt. Therefore, the installation part can be easily fixed to the installation target member by penetrating the bolt through the through hole in the fixing seat on the installation target member through the installation part and engaging the bolt with the nut and screwing the nut on the bolt.

An eighth aspect based on the sixth aspect of the present invention provides the installation structure, wherein the one fixing member comprises a bolt, and the other fixing member comprises a bracket including a female thread part to be engaged with a male thread on the bolt.

According to the eighth aspect based on the sixth aspect, the bolt having a male thread is penetrated through the through hole with intervention of the installation part to engage the male thread with the female thread of the bracket, so that the installation part can be easily fixed to the installation target member.

According to the present invention, the installation structure of the installation part capable of easily fixing the installation part to the installation target member is provided.

BRIEF DESCRIPTION OF THE DRAWINGS

The object and features of the present invention will become more readily apparent from the following detailed description taken in conjunction with the accompanying drawings in which:

FIG. 12 is an enlarged partial perspective exploded view of a modification of the installation structure for the installation part according to the second embodiment;

DETAILED DESCRIPTION OF THE INVENTION

With reference to drawings will be described a first embodiment of the present invention. The first embodiment will be described with an example where the present invention is applied to a two-seater vehicle, which has only a driver's seat and a passenger seat.

The same or corresponding elements or parts are designated with like references throughout the drawings, and thus a duplicated explanation will be omitted hereinbelow. In the first embodiment, front-rear, up-down (upper-lower), and right-left are defined on the basis of the vehicle V, and a vehicle width direction is equal to right-left direction.

Figure 1:
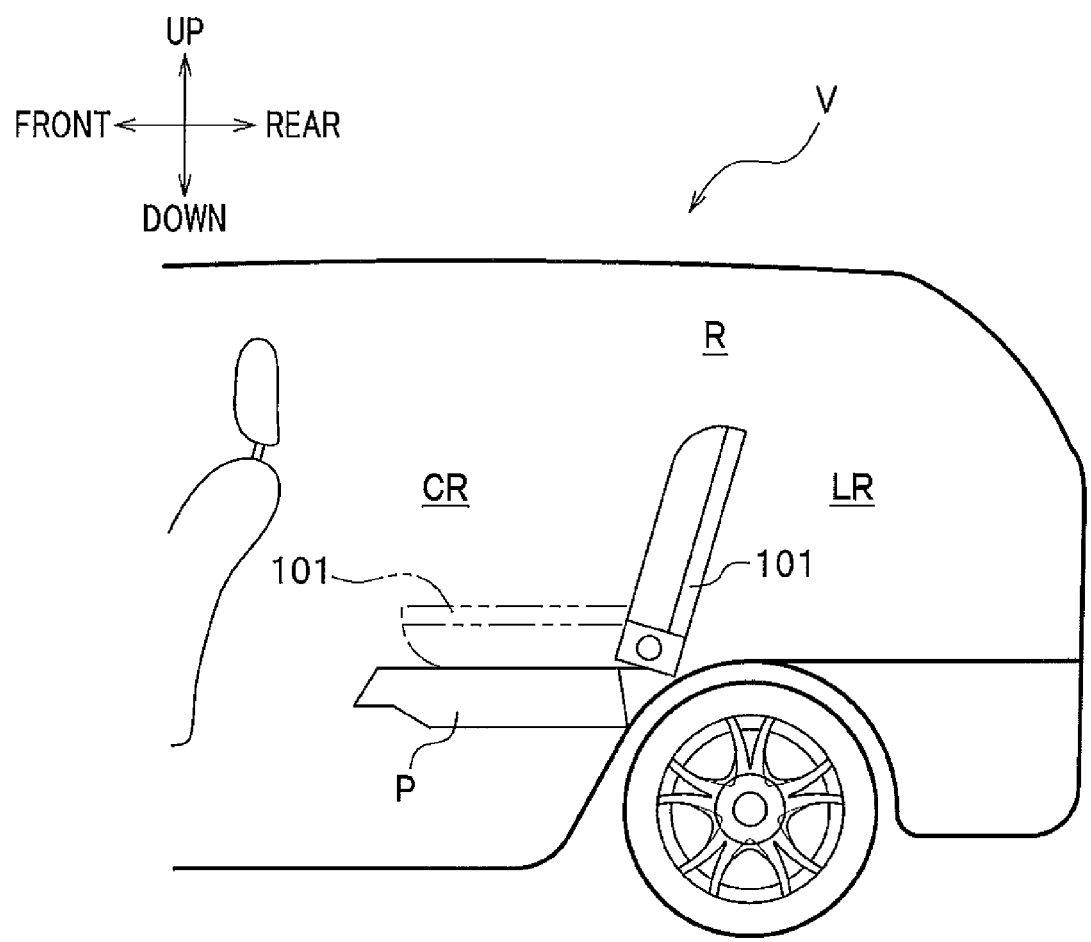
FIG. 1 is a partial side view, partially exploded, of a vehicle having a partition structure according to a first embodiment of the present invention.
Figure 2:
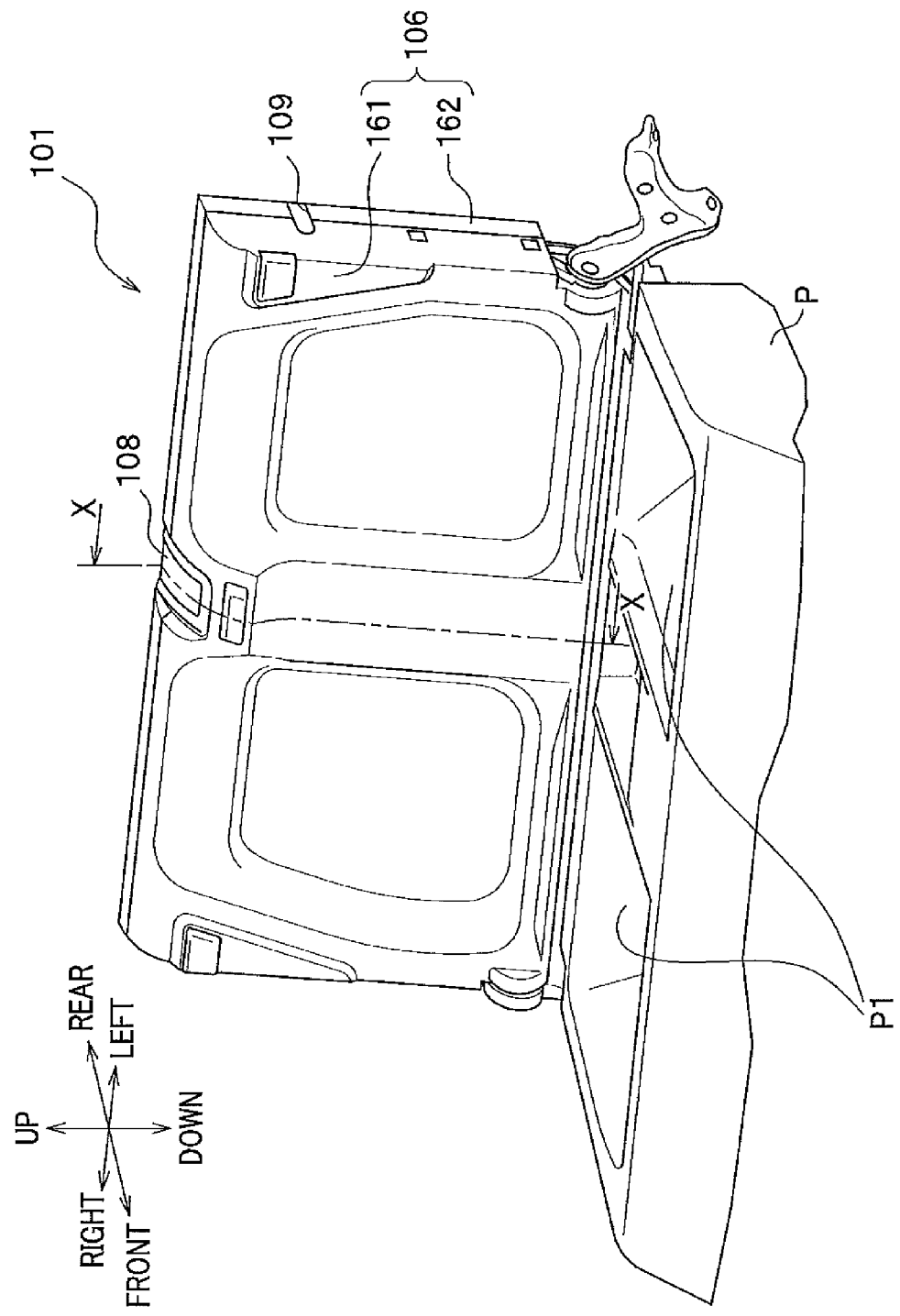
FIG. 2 is a perspective view of the partition structure according to the first embodiment.
Figure 3:
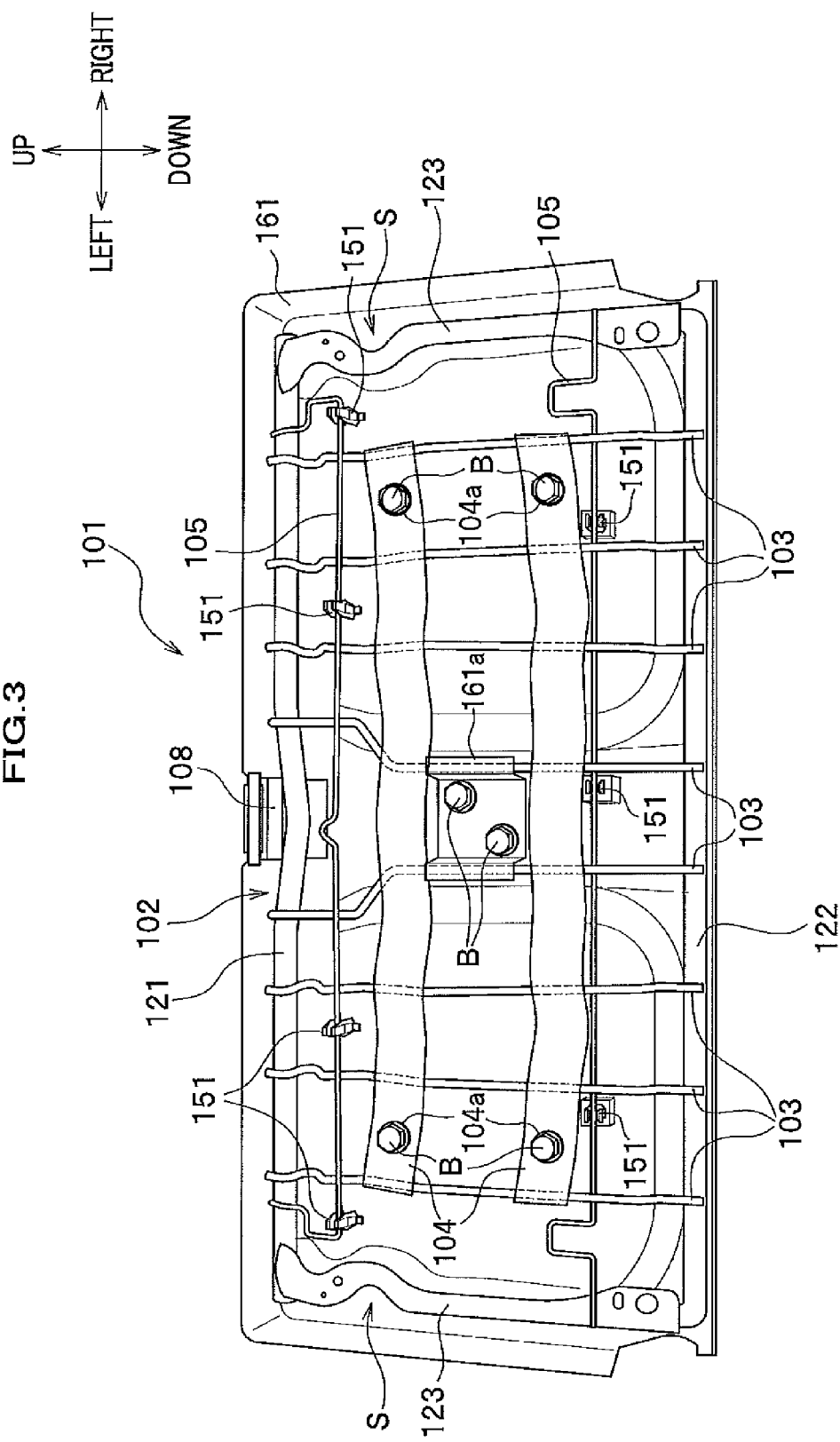
FIG. 3 is a rear view of the partition structure in which a rear cover and a sound insulating material are removed therefrom.
Figure 4:
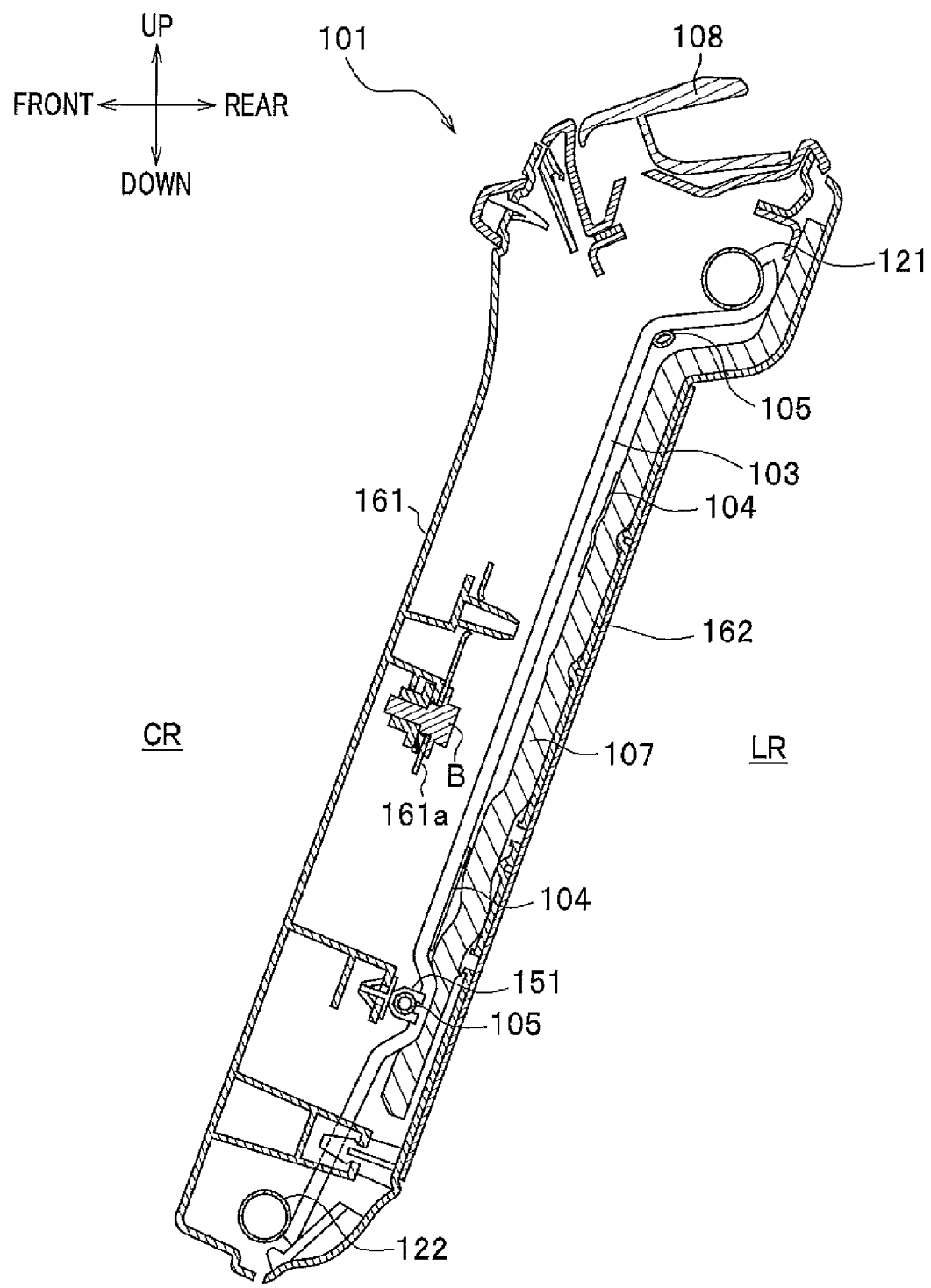
FIG. 4 is a cross-sectional view taken along X-X line in FIG. 2.

FIG. 1 is a general structural drawing illustrating a status of a vehicle V with the partition structure according to the first embodiment viewed from a side direction of the vehicle V. FIG. 2 is a perspective view of the partition structure according to the first embodiment. FIG. 3 is a rear view illustrating a status in which a rear cover 162 and a sound insulating material are removed from the partition 101. FIG. 4 is a cross section view taken along a line of X-X.

As shown in FIG. 1, the partition 101 according to the first embodiment of the present invention is installed such that an inclination of the partition is adjustable with respect to the base part to partition a room R. According to the first embodiment, the partition 101 for partition the room into a cargo room CR and a cargo room LR is exemplified.

The partition 101 can expand the cargo space by connecting the cargo room CR to the cargo room LR by inclining the partition 101 such that the front face of the partition 101 covers on the upper face of the base part P (see alternate long and two short dashes line in FIG. 1) and also allow a cargo to be placed thereon. As shown in FIG. 2, an upper part of the base part P is hollowed downward to provide containing parts P1.

As shown in FIG. 3, the partition 101 is formed mainly with a frame 102 formed with pipes combined in a substantially rectangular frame; wires 103 arranged behind the frame 102; belts 104 which orthogonally intersect the wires 103 and are arranged behind the wires 103; auxiliary wires 105 which intersects the wires 103; and a cover 106 (see FIGS. 2 and 4) covering the frame 102, the wires 103, the belts 104, and the auxiliary wires 105 from an outer side.

The frame 102 is, as shown in FIG. 3, formed with an upper frame 121 extending in the vehicle width direction, a lower pipe frame 122, extending substantially in parallel with the upper pipe frame 121, downwardly spaced from the upper pipe frame 121 with an interval; and a pair of side pipe frames 123, 123, extending in substantially orthogonal direction with the upper pipe frame 121, arranged between both ends of the upper pipe frame 121 and the lower pipe frame 122, spaced with an interval.

The upper pipe frame 121 is, as shown in FIG. 4, a metal pipe member having a hollow sleeve shape and fixed to a front cover 161 mentioned later through a supporting member (not shown).

The lower pipe frame 122 is, as shown in FIG. 4, a metal having a hollow sleeve shape and fixed to the front cover 161 through a supporting member (not shown).

The pair of the side frames 123, 123 are, as shown in FIG. 3, metal pipe members formed in a hollowed sleeve shape to have a left-right symmetry therebetween and fixed to the front cover 161. The side pipe frames 123 are formed so as to be curved inwardly at their top sides.

The curved top sides of the side pipe frames 123 provide spaces S in which locking units (not shown) mounted on the front cover 161 are arranged. The locking units are capable of coupling with strikers (not shown) formed in inner walls of the vehicle V and linked with a handle 108 formed at the middle of an upper part of the cover 106 through a wire member (lining member). In other words, in the first embodiment, the partition 101 is fixed not to be inclined to the base part P by the locking units that are fitted into the strikers in a status that the partition 101 partitions the room R into the cargo rooms CR and LR. Pulling the handle 108 in this locking state releases the fitting state between the locking units and the strikers to allow the partition 101 to be inclined forward. At side top parts of the cover 106, holes 109 are formed in front of the locking units as shown in FIG. 2.

The wires 103 as reinforcing members are made of a steel member having thin hollowed cylindrical sleeve shape as shown in FIGS. 3 and 4 and extending in substantially orthogonal direction with the upper pipe frame 121 and the lower pipe frame 122 (vertical direction). One end of the wire 103 is bent to have the same curvature as that of an outer circumferential surface of the upper pipe frame 121 and is fixed to the upper pipe frame 121 by welding after being hooked on the upper pipe frame 121. The other end (lower end) of the wire is fixed to the lower pipe frame 122 by welding. In other words, the wire 103 is bridged between the upper pipe frame 121 and the lower pipe frame 122. As shown in FIG. 3, a plurality of the wires 103 according to the first embodiment are arranged in the vehicle width direction with spaces (for example, a total of eight, i.e. four wires 103 for left and right of the partition 101). Two of the plurality of the wires 103 near the middle (in vehicle width direction) of the partition 101 are fixed to the front cover 161 through a supporting member 161a installed on an inner face (rear face) of the front cover 161 with a bolt B.

The belt 104 has, as shown in FIG. 3, a strap shape with a constant width along a longitudinal direction thereof and is formed with weaved polyester fibers which are homogeneous with a webbing of a seatbelt device. In other words, the belt 4 may comprise a webbing used in a seat belt device. The belt 104 extends in the vehicle width direction and has through holes 104a, 104a for allowing the bolt B to penetrate therethrough. The belt 104 is fixed to a bracket (not shown) fixed to an inner face of the front cover 161 with the bolts B. A plurality (for example, two) of the belts 104 according to the first embodiment are arranged vertically with an interval.

As shown in FIGS. 3 and 4, the auxiliary wires 105 are steel members having a hollowed sleeve shape with a diameter smaller than that of the wire 103. As shown in FIG. 3, in the first embodiment, a plurality (for example, two) of the auxiliary wires 105 are vertically arranged with an interval. The auxiliary wire 105 located at an upper side is arranged behind (in a rearward direction of the vehicle) the wire 103. Both ends of the auxiliary wires 105 are bent upwardly and welded on the upper frame 121 to be fixed to the upper frame 121. The auxiliary wires 105 located at a lower side is arranged in front of (a forward direction of the vehicle) the wire 103, and both ends of the auxiliary wires 105 are bridged between a pair of the side pipe frames 123, 123 and fixed to the side pipe frames 123, 123 by welding. As shown in FIGS. 3 and 4, predetermined locations of each of the auxiliary wires 105, 105 are fixed to the front cover 161 through fixing members (clipping members) 151 fixed to the front cover 161.

As shown in FIGS. 2 and 4, the cover 106 is formed with the front cover 161 facing the cargo room CR and the rear cover 162 facing the cargo room LR which are joined together to form a hollow space.

The front cover 161 located at a side of the driver has a rectangular shape as shown in FIG. 2 and is formed with polypropylene (thermal shock-resistant PP). The rear cover 162 on the opposite side of the crew side has a substantially rectangular shape 161 and is formed with polypropylene (heat resistant PP) which has a lower strength than that of the front cover 161. This structure makes it easy that the rear cover 162 is broken in the event of a collision or the like, so that a load applied to the rear cover 162 from a rear side is smoothly transmitted to the auxiliary wires 105 and the frame 102. In addition, because the rear cover 162 is located an opposite side of the crew side with intervention of the front cover 161, even if the rear cover 162 is broken, the fragments are not scattered to the crew side (within the cargo room CR).

The rear cover 162 is fixed to the front cover 161 with bolts (not shown) at appropriate locations for fixing. In addition, on an inner side (front side) of the rear cover 162 a sound insulating material 107 is provided as shown FIG. 4.

The partition 101 according to the first embodiment of the present invention is formed as mentioned above, and an operation will be described.

When a cargo loaded on a place behind the partition moves forward by an inertial force caused by for, example, a front collision or a quick service, the cargo collides with the partition 101, which generates an impact load applied to the front cover 161 of the partition 101 in a substantially orthogonal direction to the rear cover 162 of the partition 101. This breaks the rear cover 162, and the load applied to the rear cover 162 is transmitted to the belts 104 through the sound insulating material 107 (see FIG. 4).

After this, the load transmitted to the belt 104 is further transmitted to the wires 103 arranged in front the belt 104 and to the upper frame 121 and the lower pipe frame 122 (see FIG. 3).

The load transmitted to the belt 104 is further transmitted to the auxiliary wire 105 located at a lower side of the partition 101 and to the pair of side pipe frames 123, 123 (see FIG. 3).

As a result, the belts 104, the wires 103, the auxiliary wire 105, the upper frame 121, the lower pipe frame 122, and the side pipe frames 123 and the like are deformed. The deformation absorbs the load.

As mentioned above, in the first embodiment, a plurality of the wires 103 are bridged between the upper pipe frame 121 and the lower pipe frame 122, the belts 104 are arranged so as to intersect the wires 103 behind (in the rearward direction of the vehicle) the wires 103, and the auxiliary wire 105 at the lower side is bridged between the pair of the side pipe frames 123, 123. This disperses the impact load among the belts 104, the wires 103, the auxiliary wires 105, and the upper pipe frame 121, the lower pipe frame 122, and a pair of the side pipe frames 123, 123.

Accordingly, the partition 101 of the present invention can increase the impact absorbing characteristic and suppresses scattering and flying of the fragments of the broken partition on the driver's seat side (within the cargo room CR). Particularly, in the first embodiment, the front cover 161 is formed with polypropylene having a relatively high strength, which makes it difficult for the front cover 161 to be broken, which further suppresses scattering and flying of the fragments of the broken partition to the driver's seat side.

As mentioned above, the first embodiment has been described in detail with reference to the drawings. However, the present invention is not limited to the disclosure of the first embodiment, but may be modified without departure of the subject of the present invention.

In the first embodiment, the present invention is applied to the partition 101 that partitions the room into the cargo rooms CR and LR. However, the present invention is not limited to this. For example, the present invention may be applied to a partition that partitions the room into a vehicle compartment and a cargo room or a partition that partitions the vehicle compartment into a plurality of vehicle compartments.

In the first embodiment, the upper frame 121, the lower pipe frame 122, the pair of the side pipe frames 123, 123, the wires 103, and the auxiliary wires 105 are formed in hollow cylindrical sleeve shapes. However, the present invention is not limited to this. For example, hollow sleeve shapes with a rectangular cross section or a rod may be used.

In addition, in the first embodiment, eight of the wires 103 and two of the belts 104 are arranged as well as two of the auxiliary wires 105 are arranged. However, the present invention is not limited to this. For example, the number of the wires 103, the belts 104, and the auxiliary wires 105 may be changed. For example, only one of the belt 104 having a greater width may be arranged.

In addition, in the first embodiment, the wires 103 vertically extend and the belts 104 extend in the vehicle width direction, so that the wires 103 and the belts 104 orthogonally intersect with each other. However, the present invention is not limited to this. For example, the wires 103 and the belts 104 may intersect slantwise with each other by arranging the wires 3 to be inclined to the vertical (up and down direction), and the belts 104 may be inclined to the horizontal (left and right direction).

In addition, in the first embodiment, the belts 104 are fixed to brackets fixed to the inner surface (rear surface) of the front cover 161 with the bolts B. However, the present invention is not limited to this, but the belt 4 may be fixed to the side pipe frames 123 with bolts.

In addition, in the first embodiment, the auxiliary wires 105 are provided. However, the auxiliary wires 105 may be omitted.

With reference to FIGS. 5A to 10 will be described an example of an installation structure for an installation part according to a second embodiment.

<<Structure of Installation Target Member>>

Figure 5A:
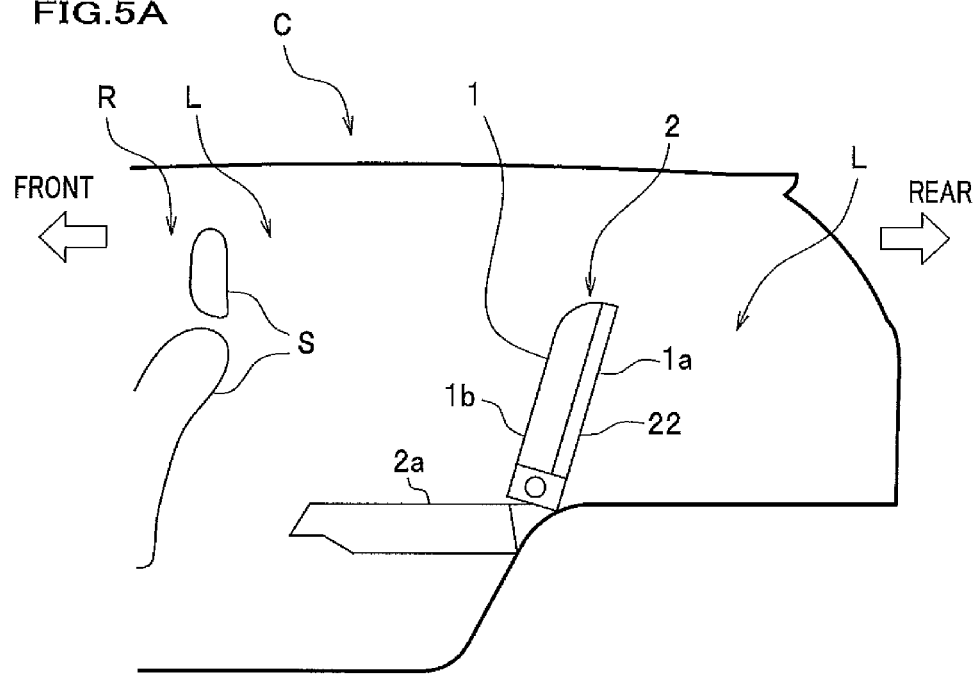
FIG. 5A is an exploded partial side view of the vehicle to illustrate an installation status of an installation target member to illustrate an example of an installation structure according to a second embodiment of the present invention.
Figure 5B:
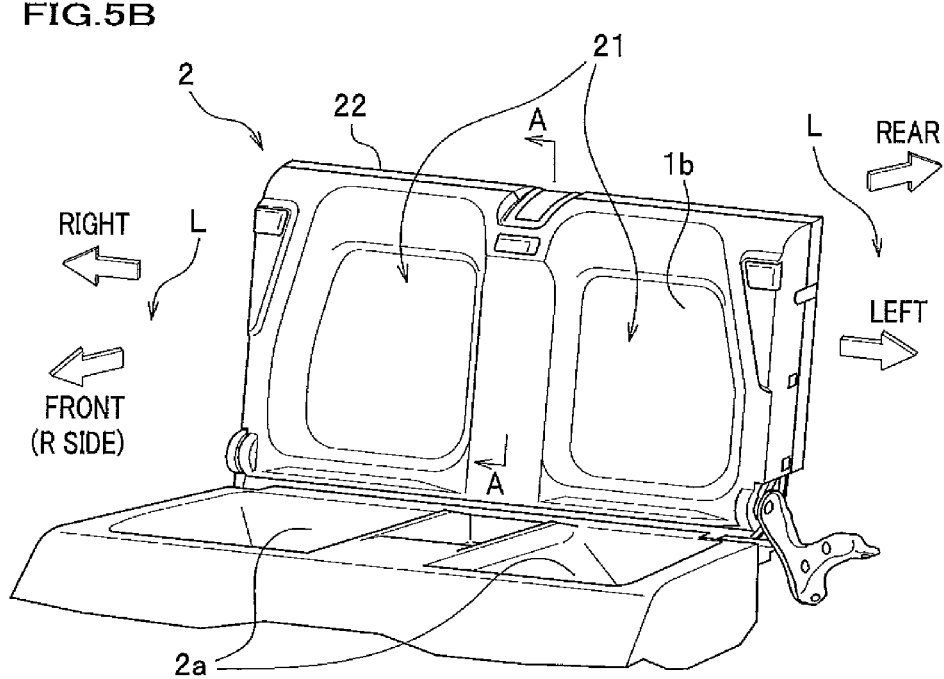
FIG. 5B is a perspective view of an example of the installation target material according to the second embodiment of the present invention.
Figure 6:
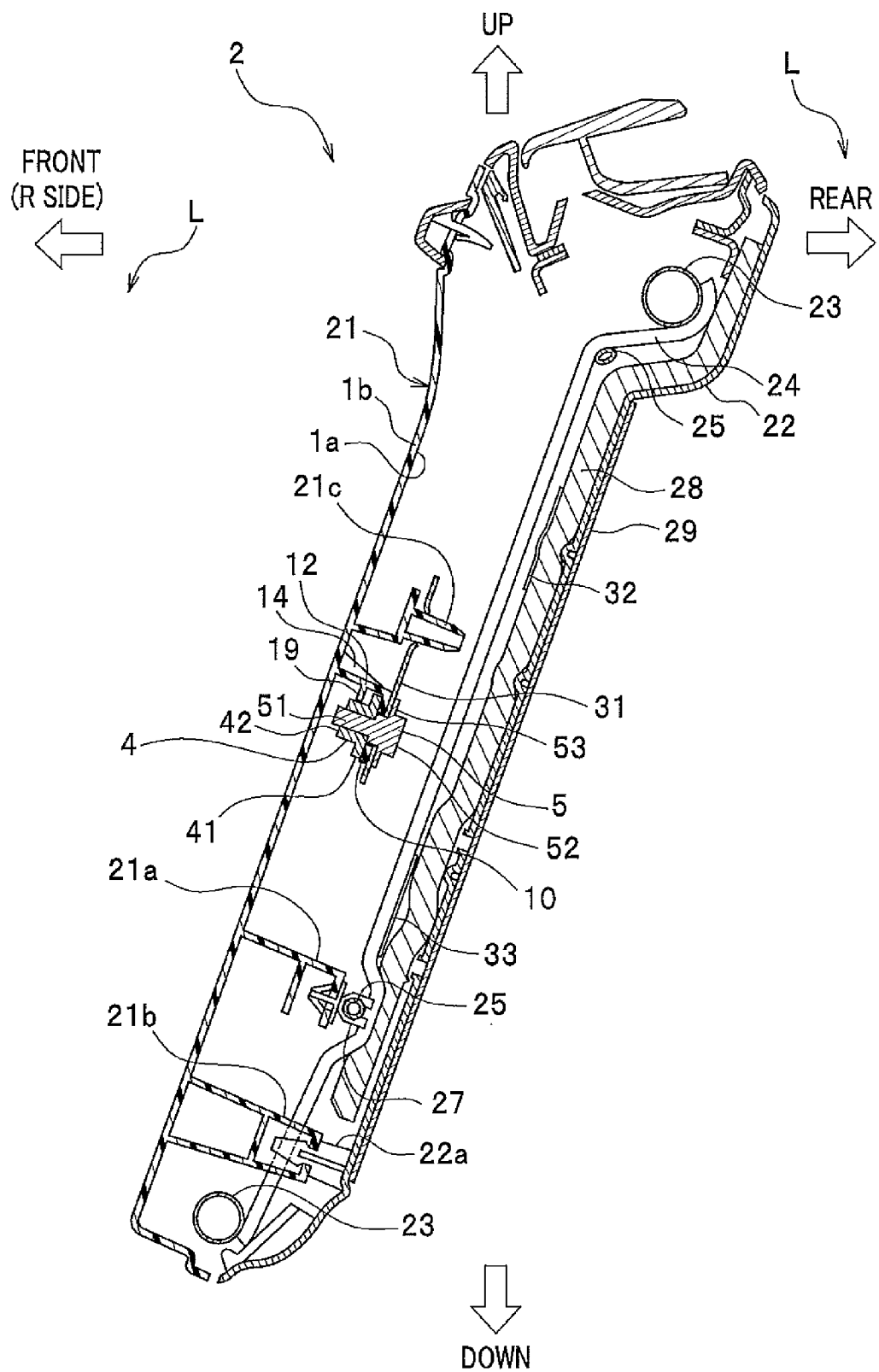
FIG. 6 is an enlarged cross-sectional view taken along A-A in FIG. 5B.

A front cover 21 (see FIG. 5B) as an installation target member 1 (see FIG. 5A) is a member to which an installation part 3 is fixed with a nut 4 (one fixing member) and a bolt 5 (the other fixing member, another fixing member) shown in FIG. 6. The installation target member 1 (21) is any member as far as the member has a fixing seat 10 that allows the installation parts 3 to be fixed by screwing the bolt 5 into the nut 4. Accordingly, the installation target member 1 is not limited to any particular one in a shape, a material, an installation location, and usage or the like.

Hereinbelow as shown in FIG. 5A, a description will be made for an example case where the front cover 21 of the partition 2, which is one of interior materials provided within the vehicle room R of the vehicle C having a two-seater type seats S, is regarded as the installation target member 1. In the installation structure of the installation part according to the second embodiment, directions thereof (front-rear and up-down) may change in accordance with an installation status of the installation part 3 such as a retaining plate 31 and the belts 32 and 33 (see FIGS. 6 and 7). To simplify the description, it is assumed that an advance direction of the vehicle C is front; a backward direction of the vehicle C is rear; and a vehicle width direction is left-right.

The partition 2 is a member of partitioning the room of the vehicle C. More specifically the partition 2 can be used for partitioning the room into a cabin and a cargo room L, or into two parts. The partition 2 will be described with a case where a cargo room L is partitioned into two parts.

The partition 2 has a shape like a seat back of a bench-seat-type rear seat, and includes a containing part 2a having a shape like a seat cushion in front of a lower end of the partition 2.

Figure 7:
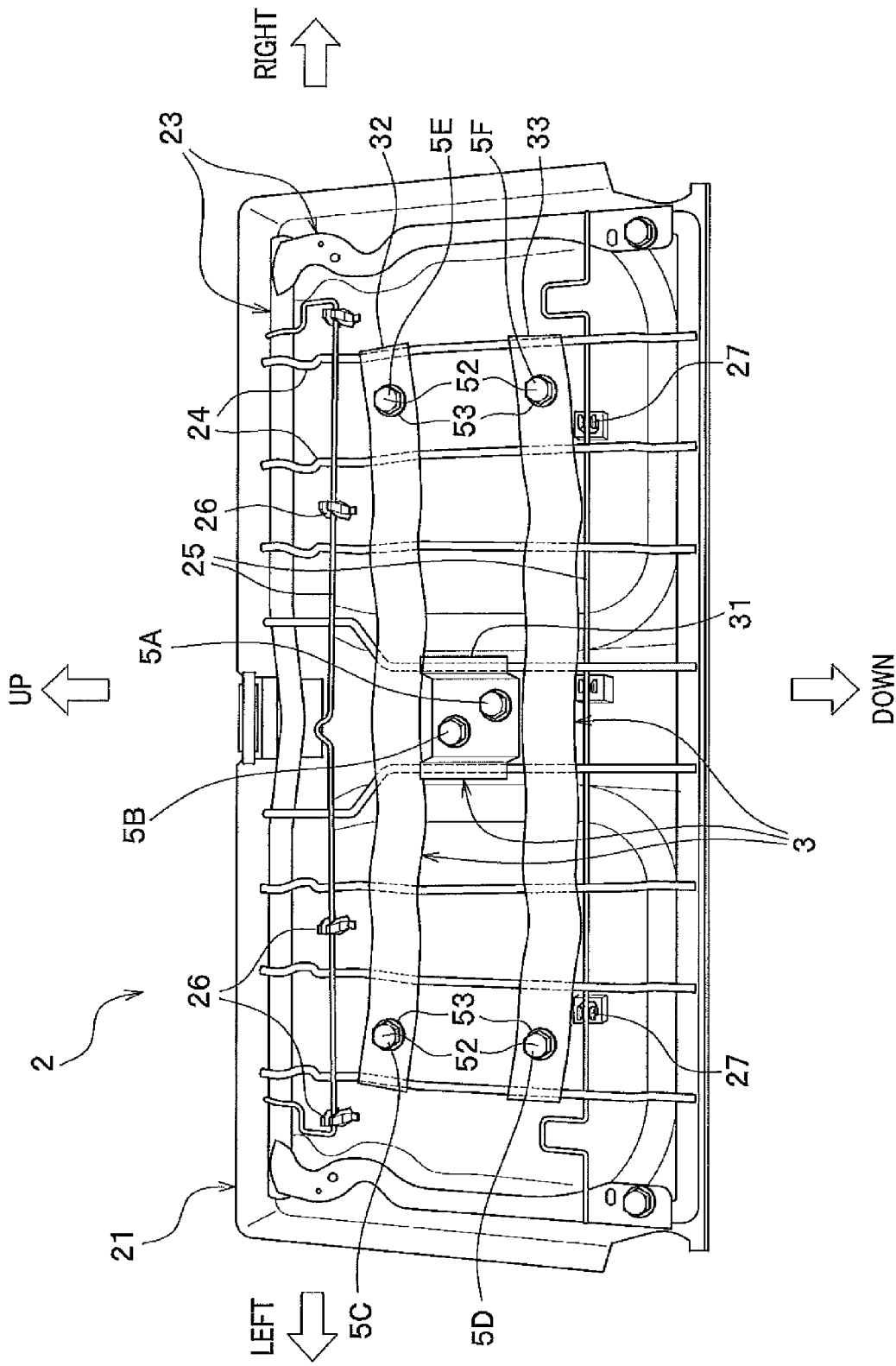
FIG. 7 is a rear view of an example of an installation structure of an installation part according to the second embodiment of the present invention, in which a cover member is removed.

As shown in FIGS. 6 and 7, the partition 2 includes the front cover 21, a rear cover 22, a skeleton frame 23, vertical wires 24, horizontal wires 25, clips 26 and 27, the installation part 3, bolts 5, nuts 4, an sound insulating material 28, and a cover material 29.

<<Front Cover Structure>>

As shown in FIG. 6, the front cover 21 is a plastic panel member having a substantially plate shape and arranged at a most forward location of the partition 2 on a front side of the vehicle. The front cover 21 is formed integrally with the fixing seat (fixing pedestal) 10, a clip-receiving protrusion 21a which is connectable to a clip 27, a fixing member receiving protrusion 21b connectable to a fixing chip 22a formed integrally with the rear cover 22, and a positioning pin 21c to be inserted into a positioning hole provided in the retaining plate 31.

<Fixing Seat Structure>

As shown in FIG. 6, the fixing seat 10 is a part on which the retaining plate 31 and the belts 32 and 33 are to be arranged as the installation part on a back surface 1a (surface side) of the front cover 21 and formed at a plurality of locations of the front cover 21 integrally with the front cover 21 with plastic.

Figure 8:
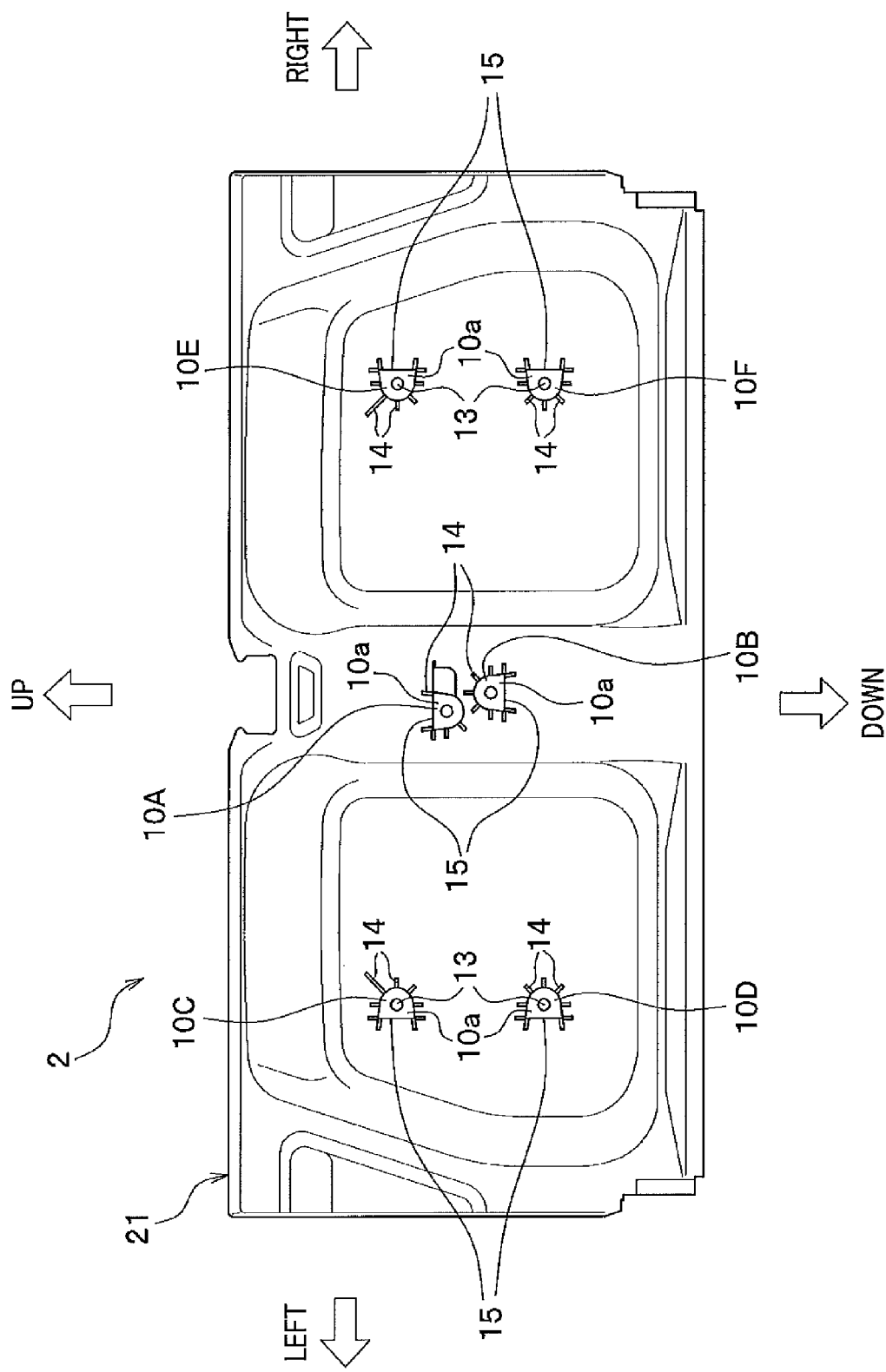
FIG. 8 is a rear view of an example of the installation structure for the installation part according to the second embodiment to illustrate a front cover as an installation target member in a status that installed members are removed.

With reference to FIGS. 7 and 8 will be described arrangement locations of the fixing seats 10 formed on the front cover 21.

As shown in FIG. 8, the fixing seats 10 are formed at a total six of locations including two locations (fixing seats 10A and 10B) at the middle of the front cover 21 and four locations (fixing seats 10C, 10D, 10E, and 10F) at left and right and up and down locations with substantially the same shapes.

The fixing seats 10A and 10B at the middle of the front cover 21 are parts to be fixed in such a status that the retaining member 31 as the installation part abuts the front cover 21 when the retaining member 31 is fixed to the front cover 21 with the bolts 5A and 5B at a middle part in FIG. 7. As shown in FIG. 8, the fixing seats 10A and 10B are formed to have openings 15 mentioned later with opening directions of up and down.

The fixing seats 10C and 10E arranged on upper left and upper right sides of the front cover 2 are parts to which the belt 32 at the upper side is fixed in such a status that the belt 32 on the upper side as the installation part contacts the fixing seats 10C and 10E when the belt 32 on the upper side is fixed to the front cover 21 with the bolts 5C and 5E at upper left and upper right side of the front cover 21 shown in FIG. 7. As shown in FIG. 8, at respective bolts 5C, 5D, 5E, and 5F on the left, right, upper, and lower sides of the partition 2, openings 15 open in left and right outward directions of the partition 2.

The fixing seats 10D and 10F on the lower left and right sides are parts to which the belt 33 on the lower side is fixed in such a status as to contact the fixing seats 10D and 10F when the belt 3 on the lower side as the installation part is fixed to the front cover 21 with the bolts 5D and 5F on the lower left and right sides shown in FIG. 7.

As shown in FIG. 7, at the fixing seats 10A and 10B at the middle of the partition 2, the bolts 5A and 5B are installed on seating faces 10a (see FIG. 8) through the retaining plate 31. At the fixing seats 10C to 10F on the upper, lower, left, and right sides of the partition 2, the bolts 5C and 5F are installed on seating faces 10a (see FIG. 8) through the belts 32 and 33.

Below will be described respective parts of the fixing seat 10 regarding a shape or the like, mainly referring FIGS. 9 and 10, in which the fixing seat 10C for fixing a left end of the upper side belt 32 to the installation target member 1 is exemplified.

Figure 9:
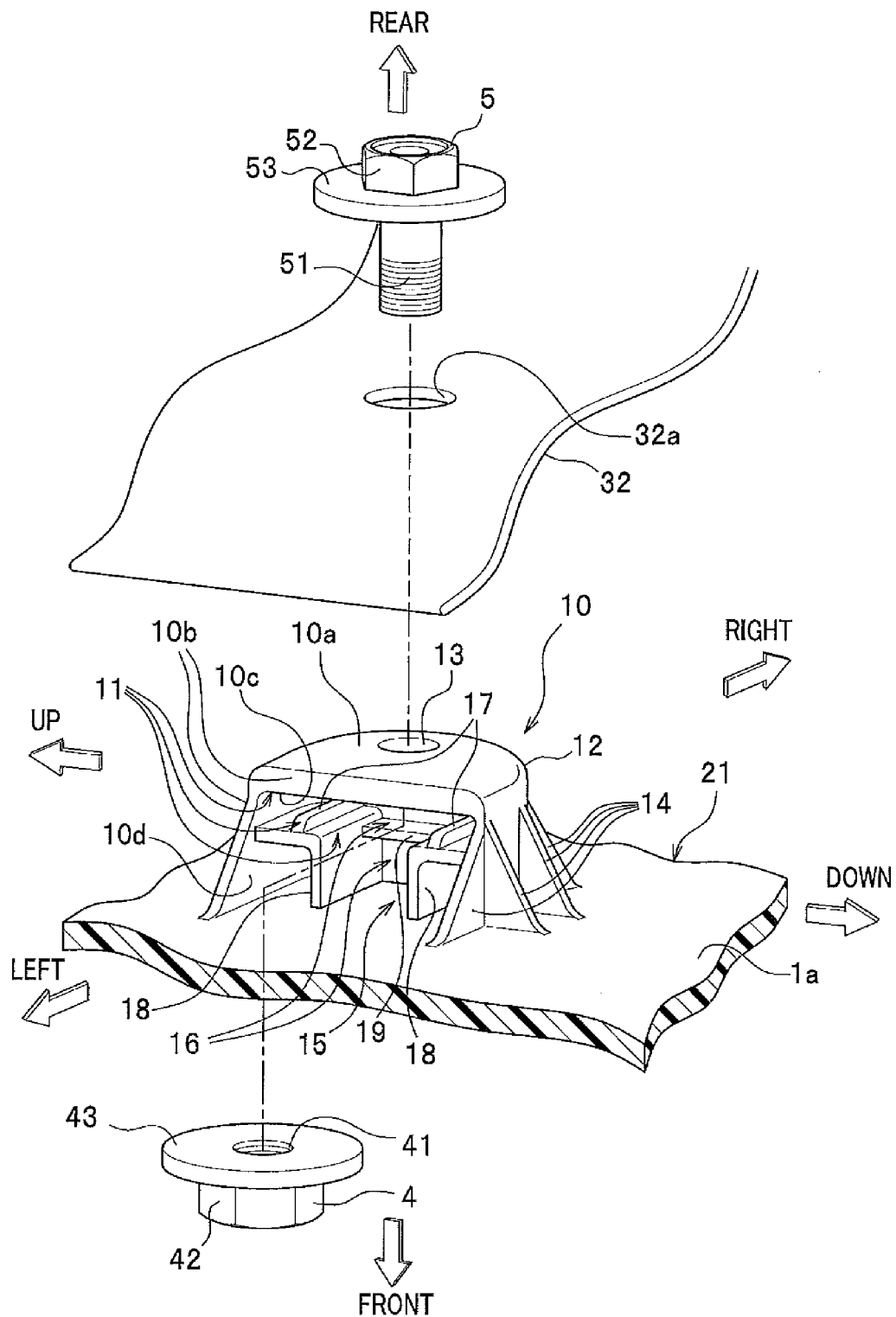
FIG. 9 is an enlarged partial perspective, exploded view of the installation structure for the installation part according to the second embodiment.

As shown in FIG. 9, at each fixing seat 10 (fixing seats 10A to 10F), the seating face 10a, a side face 10b, a back surface 10c, an inner side face 10d, a holding part 11, a housing 12, a through hole 13, ribs 14, the opening 15, an engaging space 16, protruding parts 17, L-shape supporting chips 18, 18, and a plate supporting chip 19 are integrally formed.

On the seating face 10a of the fixing seat 10 is a face abutting a flange 53 of the bolt 5C when the bolt 5 is fixed to the fixing seat 10 through the belt 32. The seating face 10a has a flat plane in a substantially semicircle shape formed at the most rearward face of the housing 12 protruding from the front cover 21 in the rearward direction.

The side face 10b is a side part of the housing 12 formed in a substantially semi-cylindrical shape. On the side face 10b, ribs 14 are formed so as to extend outwardly, radially.

The back surface 10c of the fixing seat 10 is a ceiling face of the housing 12 which a surface of the flange 43 of the nut 4 abuts when the nut 4 is inserted into the holding part 11 to be held by the holding part 11.

On the inner side wall 10d of the housing 12, a pair of L-shape supporting chips 18, 18 and a plate supporting chip 19 are integrally formed.

The holding part 11 is a part, formed in the housing 12, for holding the nut 4 in which rotation of the nut 4 (one fixing member) is prevented by abutment of the nut 4 inserted in the opening 15 on the holding part 11. At the holding part 11, a through hole 13, the ribs 14, the opening 15, a engaging space 16, the protruding parts 17, the L-shape supporting chips 18, 18 and the plate supporting chip 19 are formed.

The housing 12 is a hollow semi-circle sleeve protrusion extending rearward from a back surface 1a of the front cover 21 as the installation target member, the fixing seat 10 for supporting the belt 32 being formed at a tip thereof. Because the housing 12 has the opening 15 at a side face 10b thereof, the housing 12 is formed in a substantial semi-circuit cylindrical shape such that a cup is vertically cut into two parts.

The through hole 13 is a hole into which a male thread part 51 of each of the bolts 5A to 5F is inserted therethrough for support and made at a middle of the seating face 10a to provide communication with the engaging space 16.

The rib 14 is a reinforcing plate member for reinforcing the housing 12, formed at a plurality of locations on the outer surface of the housing 12 so as to extend from a lower end of the outer surface of the housing to a top surface of the front cover 21 with a substantially right-angled triangle plate shape.

The opening 15 is a part provided to insert the nut 4 into the inside of the housing 12 and made by such a manner that a side face 10b on the left side of the housing 12 is vertically cut and removed.

The engaging space 16 is an installation space formed inside the opening 15 where the nut 4 (one fixing member) is engaged with the bolt 5 and formed in a substantially T-shape to fit a head 42 and the flange 43 of the nut 4 when viewed from a direction of the opening 15. The engaging space 16 is provided by the inner side wall 10d, the back surface 10c, the protruding parts 17, the L-shape supporting chips 18, 18, and the plate supporting chip 19.

The protrusion parts 17, 17 are parts to abut a face of the flange 43 on the side of the head 42 to suppress play of the nut 4 fitted into the holding part 11. The protrusion parts 17 are a pair of rail-like protrusion extending in parallel each other formed on a pair of faces of the L-shape supporting chips 18, 18 on the side of the back surface 10c.

The L-shape supporting chips 18, 18 include a pair of horizontal plate members for supporting upper and lower faces of the head 42 of the nut 4 and a pair of vertical plate members contacting vertical faces of the nut 4 in order to support the nut 4 without rotation.

The plate supporting chip 19 is a flat plate member extends perpendicularly to and from the inner side wall 10d toward the opening 15 between the pair of the L-shape supporting chips 18. The plate supporting chip 19 is a part for supporting a right side of the head 42 fitted into the engaging space 16 to suppress play of the nut 4 fitted into the engaging space 16. The plate supporting chip 19 is bridged from one to the other of the L-shape supporting chips 18 in a plate like shape, extending in the vertical direction.

<<Structures of Clip-Receiving Protrusion and Fixing Member Receiving Protrusion>>

As shown in FIG. 6, the clip-receiving protrusion 21a is a protrusion extending from the back surface of the front cover 21 rearward and has, at tip thereof, a flat fixing surface having a through hole through which the clip 27 is to be inserted.

The fixing member receiving protrusion 21b is a protrusion extending from the back surface of the front cover 21 rearward and has, at tip thereof, a flat fixing surface having a through hole through which the fixing chip 22a is to be inserted.

<<Structure of Rear Cover and Skelton Frame>>

As shown in FIG. 6, the rear cover 22 is a panel member arranged on a rearward face of the partition 2 to form a surface on the back surface of the partition 2.

The skeleton frame 23 is a skeleton member for forming a framework, formed with, for example, metal pipes formed in a frame shape having a rectangular shape matched to the shape of the partition 2.

<<Structures of Vertical and Horizontal Wires and Clip>>

As shown in FIG. 7, the vertical wires 24 and the horizontal wires 25 are metal wires grid-like arranged on the skeleton frame 23 having a frame shape with adequate intervals to have a grid. The vertical wires 24 comprise a plurality of wires vertically arranged on the upper and lower skeleton frames 23. The horizontal wires 25 comprise a plurality of wires horizontally arranged on the left and right skeleton frames 23.

The clips 26 and 27 are holding members for fixing the horizontal wires 25 to the front cover 21. The clips 26 and 27 are fixed to the clip-receiving protrusion 21a at front ends thereof and rear ends are fixed to clip the horizontal wires.

<<Structure of Installation Part>>

As mentioned above, the installation part 3 is a part (component) to be fixed to the front cover 21 as the installation target member with the bolt 5 and nut 4. More specifically, the installation parts 3 are the retaining plate 31 and the belts 32 and 33 to be fixed to the front cover 21 as the installation target member in FIG. 7. As shown in FIG. 9, the installation part 3 may be any part as far as the part has the through hole 32a into which the male thread part 51 is inserted (penetrated therethrough) without any limitation in thickness, shape, and material.

<<Structure of Nut>>

As shown in FIG. 9, the nut 4 is one fixing member for fixing the installation part 3 to the front cover 21 by engagement of the nut 4 with the bolt 5.

The nut 4 is, for example, a hexagonal nut with a flange including a female thread part 41, a head 42, and the flange 43 which are integrally formed. The nut 4 is inserted into the holding part 11 through the opening of the fixing seat 10 and fitted into the engaging space 16 to be held.

The female thread part 41 is a part engaged with the male thread part 51 in a status that center lines of the female thread part 41 and the male thread part 51 coincide with a center line of the through hole 13.

The head 42 comprises, for example, a hexagonal nut and fitted into the engaging space 16.

The flange 43 is a ring-shape part like a washer formed integrally with the head 42 and inserted and held between the protrusion parts 17 and the back surface 10c of the seating face 10a of the holding part 11. An outer circumference of the flange 43 is formed to have substantially the same diametrical size as the inner diameter of the inner side face 10d so that the center line of the female thread part 41 coincides with the center line of the through hole 13 when the nut 4 is fitted into and abuts the holding part 11.

<<Structure of Bolt>>

As shown in FIG. 9, the bolt 5 is a fixing part (the other fixing part) for fixing the installation part 3 (32) to the front cover 21 by screwing the bolt into the nut 4. The bolt 5 has, for example, the male thread part 51, the head 52, and the flange 53. The bolt 5 is any bolt as far as the bolt 5 has the male thread part 51 and not limited in, for example, a shape.

The male thread part 51 is a part engaged with the female thread part 41. The male thread part 51 is inserted into the through hole 32a of the belt 32 and a through hole 13 of the fixing seat 10 and engaged with the female thread part 41 to fix the belt 32 to the front cover 21 as the installation target member.

The head 52 is formed in a shape like, for example, the hexagonal nut.

The flange 53 may be a flange-shaped part formed integrally with the head 52 or a ring washer separated from the bolt 5.

<<Structure of Sound Insulating Material and Surface Material>>

As shown in FIG. 6, the sound insulating material 28 is a thick-plate-like member with a sound absorbing function and arranged on a front side of the rear cover 22.

The surface material 29 is a thin-plate like member forming a surface on the rear side of the partition 2.

<<Operation>>

Figure 10:
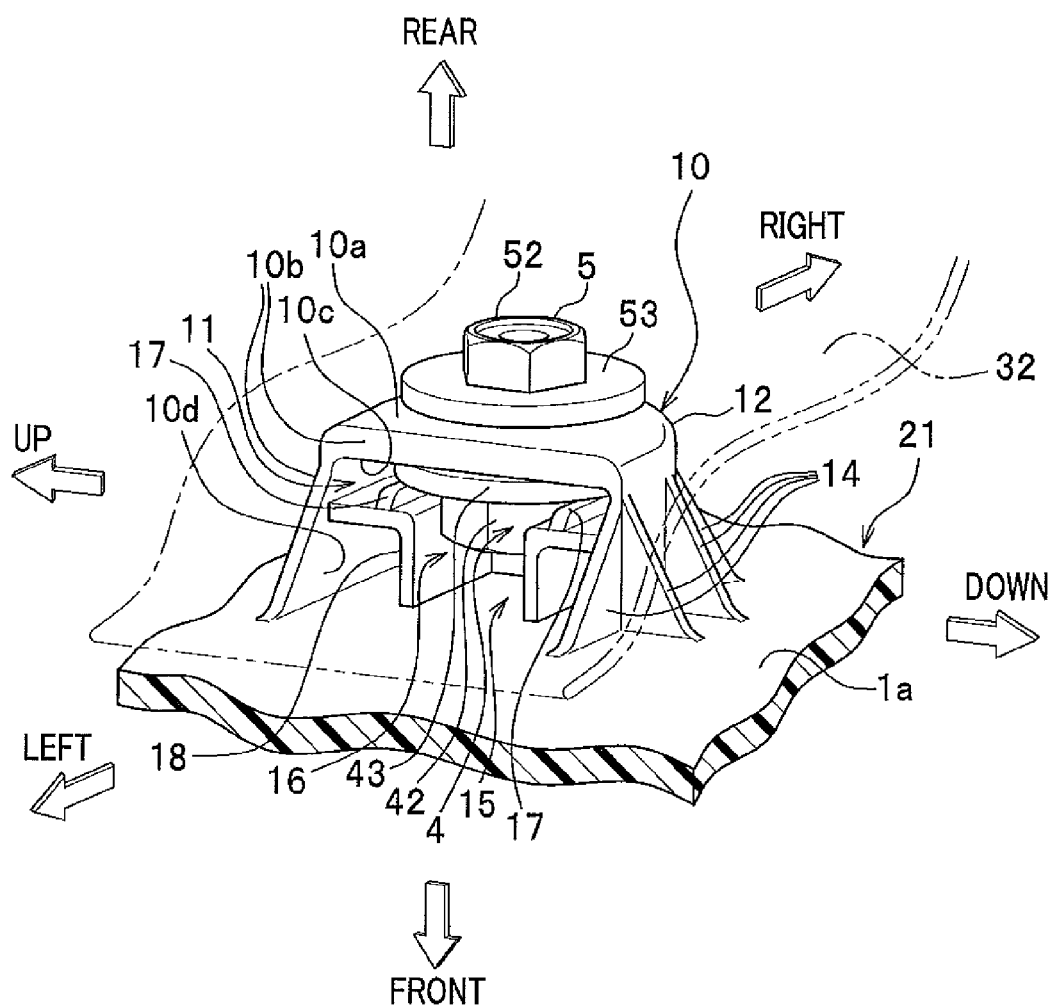
FIG. 10 is an enlarged partial perspective view of the installation structure for the installation part according to the second embodiment.

With reference to FIGS. 9 and 10 will be described an operation of the installation structure of the installation part according to the second embodiment.

When the belt 32 is fixed to the front cover 21, first, as shown in FIG. 9, the nut of which flange 43 is positioned rearward is inserted into the engaging space 16 in the holding part 11 through the opening 15 of the fixing seat 10. Then, the nut 4 is pinched between the upper and lower L-shape supporting chips 18 as well as a right side of the head 42 abuts the plate supporting chip 19 to be supported. This disables the nut 4 from being rotated.

In addition, the flange 43 of the nut 4 is held in which a rearward surface thereof contacts the back surface 10c, and the front surface contacts the protrusion parts 17, 17. The nut 4 is fitted at the outer surface thereof into the inner side face 10d between the back surface 10c and the protrusion parts 17, 17 without play in front-rear direction. In addition, the center line of the female thread part 41 coincides with the center line of the through hole 13.

Then, the operator can make engagement of the bolt 5 (5C) with the nut 4 without supporting the nut 4 by hand because the nut 4 is held within the fixing seat 10 without rotation when the operator screws the male thread part 51 penetrated through the through hole 32a of the belt 32 into the female thread part 41 of the nut 4. Accordingly, the operator can easily fix the belt 32 to the front cover 21 because the operator can screw the bolt 5 into the nut 4 only by holding only the bolt 5 by hand for rotation. As a result, the installation part 3 such as the belt 32 can be easily fixed to the installation target member 1. This increases the workability of the installation operation of the belt 32 or the like.

[Modification]

The present invention is not limited to the disclosure of the second embodiment and can be modified within technical idea of the present invention and covers such a modification. Hereinbelow will be described a modification of the second embodiment. The same or corresponding elements that have been described are designated with the same or like references, and thus a duplicated description will be omitted.

Figure 13A:
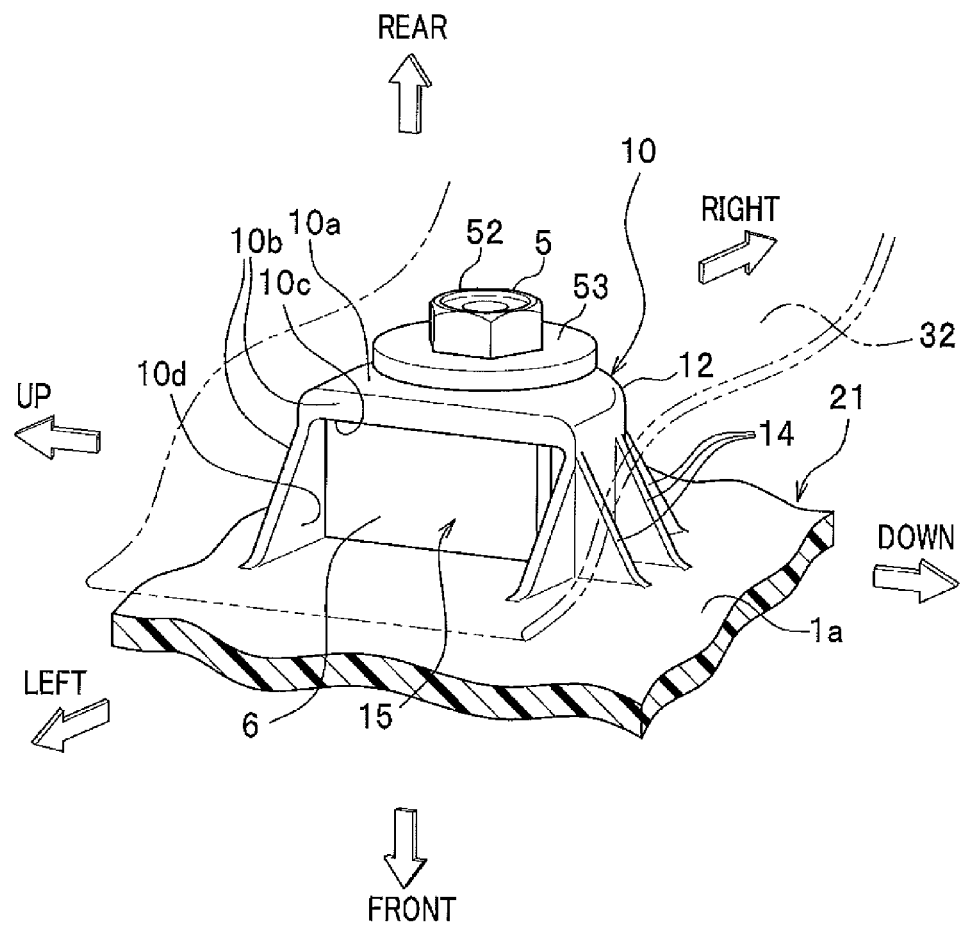
FIG. 13A is a partial perspective view of a modification of the installation structure according to the second embodiment to illustrate a status when the bracket is inserted into the housing.
Figure 13B:
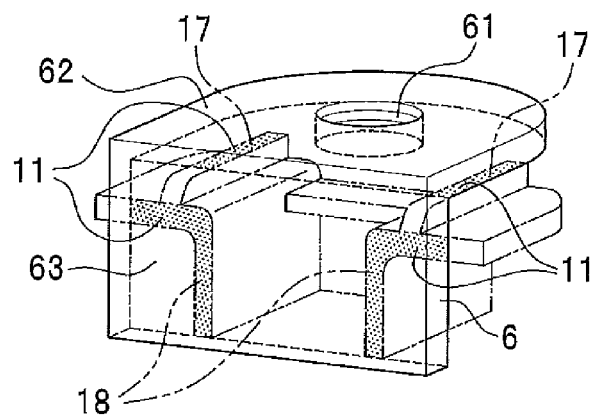
FIG. 13B is a partial perspective view of the modification of the installation structure according to the second embodiment to illustrate a status when the bracket abuts protrusion parts and L-shape supporting chips.

With reference to FIGS. 12 to 13B will be described a modification.

Figure 11:
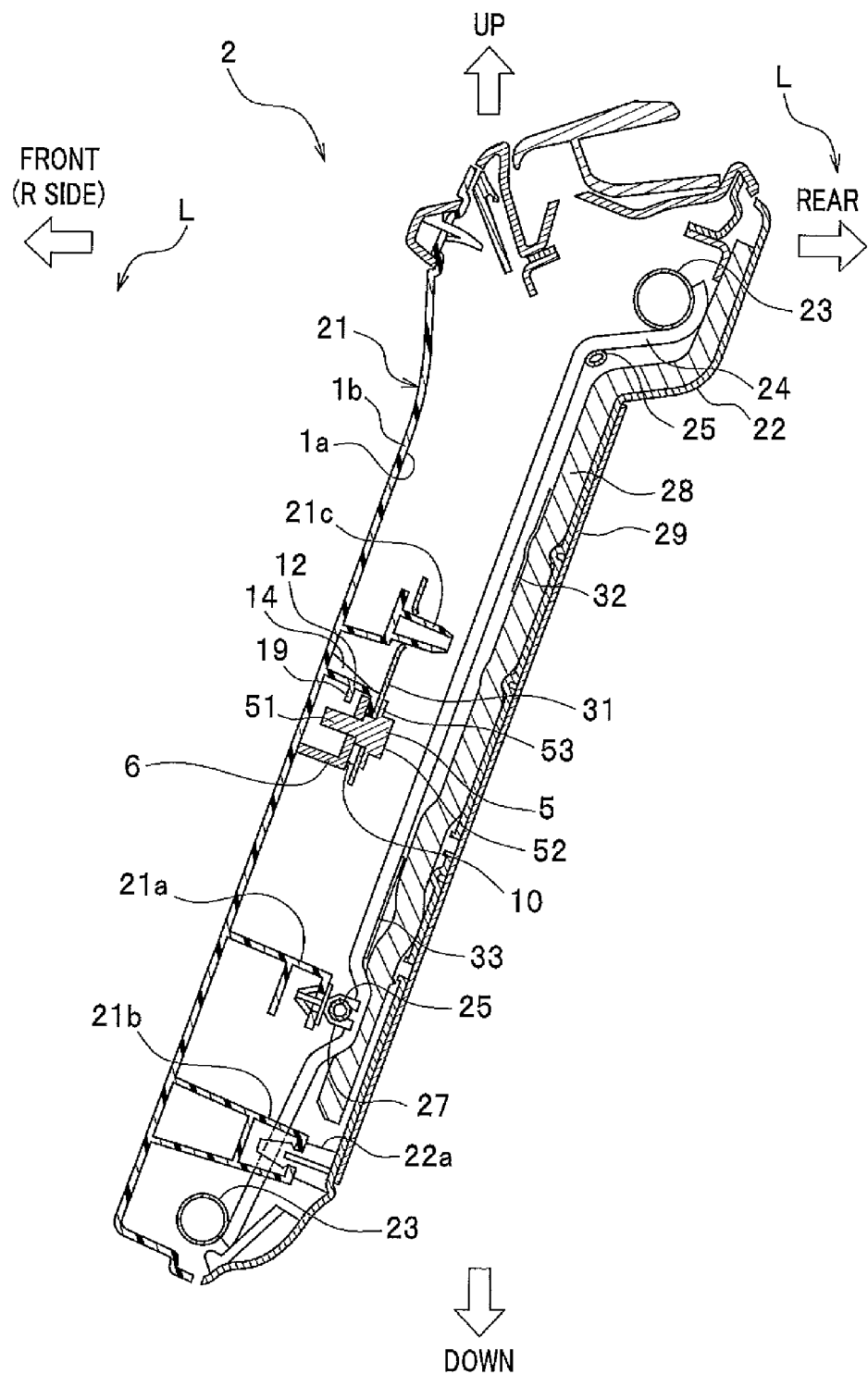
FIG. 11 is an enlarged cross-sectional view of a modification of the installation structure for the installation part according to the second embodiment.

FIG. 11 is an enlarged cross-sectional view of a modification of the installation part according to the second embodiment. FIG. 12 is an enlarged exploded perspective view of the modification of the installation structure for the installation part according to the second embodiment. FIGS. 13A and 13B illustrate a modification example of the installation structure for the installation part according to the second embodiment. FIG. 13A is an enlarged perspective view illustrating a status when a bracket is inserted into the housing. FIG. 13B is an enlarged perspective view of the bracket when the bracket abuts the protrusion parts and the L-shape supporting chips.

In the second embodiment, as shown in FIG. 9, the case that the nut 4 as one fixing part is engaged with the bolt 5 as the other fixing part, is exemplified for description, but the second embodiment is not limited to this.

As shown in FIGS. 11 to 13B, one fixing member is a plate 6 bent in an L-shape, and the bolt 5 is used as the other fixing member, so that the installation part can be fixed to the installation target member similarly to the second embodiment.

In this case, parts other than the nut 4 are the same as those described in the second embodiment.

The bracket 6 is the one fixing member and formed from a thick metal plate having a substantially L shape. The bracket 6 includes an insertion plate 62 that is inserted into the engaging space 16 inside the housing 12 to be held there, a fitting plate 63 formed to be inserted into the opening 15 of the housing 12, and a female thread part 61 engaged with and screwed on the male thread 51 formed one the bolt 5.

The insertion plate 62 is a thick plate member formed to be in parallel to the seating face 10a of the fixing seat 10 in an inserted position and fitted into the holding part 11 between the back surface 10c and the protrusion parts 17, 17 when the bracket 6 is inserted into the holding part 11 (see FIG. 13B). The fitting plate 63 is formed by bending a middle of the bracket 6 toward the rear side surface 1a at a right angle. The fitting plate 63 is inserted so as to close the opening 15 when the bracket is inserted into the holding part 11 (see FIG. 13A). The fitting plate 63 is supported by that a right side face of the fitting plate 63 abuts a left side surface of the L-shape supporting chips 18, 18 (see FIG. 13B) and has dimensions in the up-down direction and the front-rear direction which are substantially the same as those of the opening of the housing 12.

The female thread part 61 is provided at a center area of the insertion plate 62, a center line of the engaging space 16 coinciding with the center line of the through hole 13.

When being inserted into the holding part of the housing 12, the bracket 6 formed as mentioned above is assembled in a status that the insertion plate 62 and the fitting plate 63 abut the inner side face 10d. This prevents the bracket 6 from rotating with the bolt 5 (5C) though the bolt 5 inserted into the female thread part 61 through the through hole 13 is rotated.

As mentioned above, the one fixing member (the bracket 6) may have any shape as far as the fixing member can be held in the holding part 11 of the fixing seat 10 in addition to having the female thread part 61 to be engaged with the male thread part 51.

<<Other Modifications>>

In the second embodiment, as shown in FIG. 9, the hexagon nut is exemplified as the nut 4. However, the shape of the nut is not limited and may be a polygon such as a square. For example, the nut 4 may be a cap nut.

The flange 53 can be appropriately formed in accordance with the area size of the seating face 10a, may have a washer-like shape such as a polygon, and may be omitted.

The invention claimed is:

1. A partition structure for absorbing an impact energy applied to a partition partitioning a room in a vehicle, comprising:
    a cover;
    a plurality of reinforcing members, extending in a direction substantially vertical to a width direction of the vehicle, arranged with an interval inside the cover in the width direction of the vehicle; and
    a belt arranged behind the reinforcing members so as to intersect the reinforcing members.

2. The partition structure as claimed in claim 1, further comprising a pair of pipe frames arranged in up-down direction with an interval in front the reinforcing members, both ends of each of the reinforcing members being fixed to the pair of the pipe frames.

3. The partition structure as claimed in claim 1, further comprising:
    a pair of side pipe frames arranged with an interval in the width direction of the vehicle; and
    an auxiliary wire, extending in the width direction of the vehicle, arranged in front the reinforcing members so as to intersect the reinforcing members, both ends of the auxiliary wire being fixed to the pair of the side pipe frames.

4. The partition structure as claimed in claim 1, wherein the cover comprises a front cover arranged on a side of a driver's seat of the vehicle and a rear cover on an opposite side of the front cover viewed from the side of the driver's seat.

5. The partition structure as claimed in claim 1, wherein each of the reinforcing members comprises a wire.

6. The partition structure as claimed in claim 1, wherein the belt comprises a webbing used in a seat belt device.

* * * * *